Jan. 17, 1967        O. P. JUNO        3,298,247
COUNTERBALANCING WEIGHT FOR BARBECUE SPITS
Filed July 6, 1965
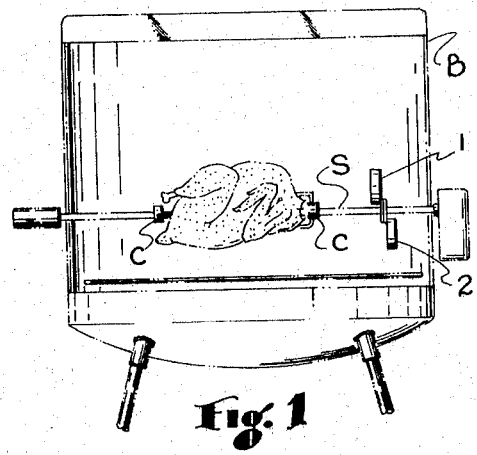
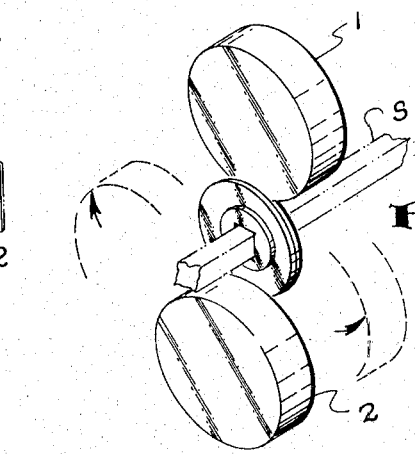
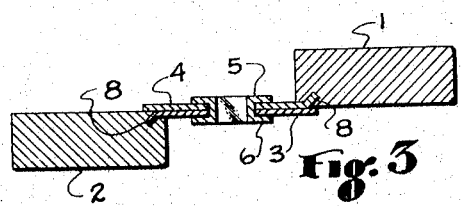
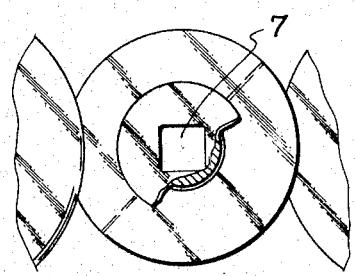
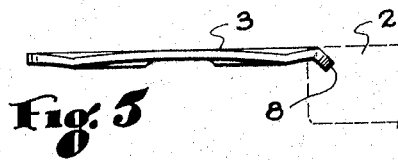
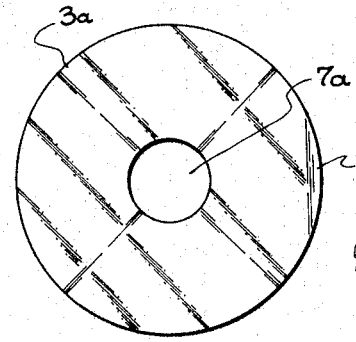
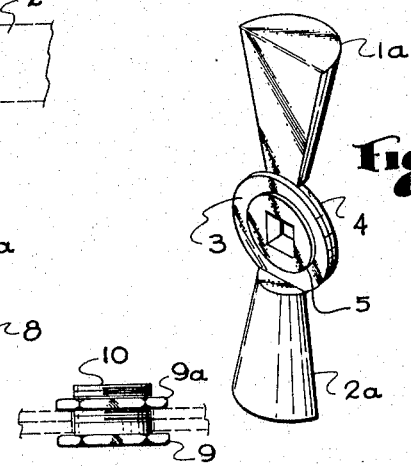
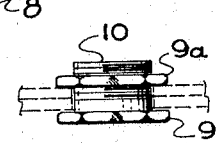
INVENTOR.
OSCAR P. JUNO
BY M A Gray
AGENT

United States Patent Office 3,298,247
Patented Jan. 17, 1967

3,298,247
COUNTERBALANCING WEIGHT
FOR BARBECUE SPITS
Oscar P. Juno, 221½ W. California St.,
Ontario, Calif. 91761
Filed July 6, 1965, Ser. No. 469,777
3 Claims. (Cl. 74—573)

This invention relates to a counterbalancing weight for barbecue spits.

It is well known that in the process of barbecuing by means of a powered rotating spit, there is difficulty in securing and clamping certain loads such as fowl, for instance, and that is becomes loosened primarily due to the unbalanced position on the spit.

Even though the clamping member remains secure, there is a tendency during rotation to lurch unevenly, thereby working the load loose on the spit and also placing an irregular strain on the geared mechanism.

The present invention pertains to a simple and effective means of eliminating the foregoing difficulty by mounting a counterbalancing weight in the barbecue spit. Provision is made for easy adjustment of the weight to meet the particular conditions of the load which is mounted on the spit.

The present device may be economically produced and is equally suitably adapted to any make or model of barbecuing unit.

Other objects and advantages of the invention will be found in the description, the drawings, and in the claims; and for complete understanding of the invention, reference may be had to the following detailed description and the accompanying drawings wherein:

FIG. 1 is a side elevational view of a powered barbecue unit, and showing the counterbalancing weight mounted upon the spit;

FIG. 2 is a side perspective view of the device, a fragmentary portion of the spit being indicated by broken lines, while the dotted line illustration and arrows suggest the adjustment of weights with respect to each other;

FIG. 3 is a mid-sectional view of the device shown in FIG. 2;

FIG. 4 is a fragmentary side view in elevation somewhat enlarged and showing in detail the relation of the securing members at the center portion thereof;

FIG. 5 is an edge view of one of the central mounting plates, a fragmentary portion of one of the weights being indicated in dotted lines;

FIG. 6 is a side elevational view of the central mounting disc shown in FIGS. 4 and 5;

FIG. 7 illustrates a modified form of the weights; and

FIG. 8 is a fragmentary edge view of the hub indicating the use of nuts as a fastening means on a threaded member, with related portions fragmentarily shown in dotted lines.

Referring to the drawing more in detail, FIG. 1 represents a conventional barbecue unit B having a spit S and clamps C with the counterbalancing weight in position on the spit.

The weight members 1 and 2 are preferably made of lead, or the like, so that the central mounting discs 3 and 4 may be firmly embedded therein. This provides a simple and effective means of securing the weights.

An important feature of the present invention resides in the centrally mounted discs 3 and 4 being laterally bent, or deformed, so that a spring-like action is provided therebetween, and in order that sufficient resistance to rotation will be maintained during the rotary motion of the spit as to hold the weights in the set position. The particular pattern of deforming the discs depends, of course, upon the size, design, and weight of the counterbalancing weights 1 and 2, or 1a, 2a.

The discs 3 and 4 are mounted in an integrally formed hub 5, 6 to provide a permanently secured assembly of the said discs. It is also noted that a small bent portion is provided at the edge of the discs 3, 4 as is indicated at 8 in FIGS. 3, 5 and 6. FIG. 4, by means of a portion being broken away at the center indicates the mounting more in detail. Of course the central opening may be square, as shown at 7 in FIG. 4, or circular, as at 7–a; the square opening being preferred. FIG. 8 shows the use of nut members in connection with the circular mounting means comprising an externally threaded tubular member 10 having an integrally formed nut 9 at one end and a threaded nut 9a adapted to engage the said threaded portion 10.

An important aspect of the counterbalancing weight of the present invention is the extent to which the wear on the gears of the rotating mechanism is minimized. This is due to the fact that, when the weights are properly adjusted, the uneven lateral movement and vibration is eliminated, hence allowing uniform delivery of power to the loaded spit.

Although FIG. 7 shows a modified form of the weight members 1–a, 2–a it is obvious that other forms may be availed of without departing from the spirit of the present invention.

It is obvious that while there is shown and described specific forms and embodiments of the device, it is to be understood that modifications may be made without departing the general design and the particular materials used in the manufacture, being limited only by the scope of the appended claims.

I claim:
1. In a counterbalancing weight unit for a barbecue spit; the combination comprising a pair of opposingly and adjustably mounted weight members, said weight members being rigidly joined to a pair of contacting discs, said contacting discs being frictionally retained by a centrally disposed hub having a central opening therethrough.

2. In a counterbalancing weight unit for a barbecue spit; the combination comprising a pair of opposingly and adjustably mounted weight members, said weight members being integrally joined to a pair of contacting discs, said contacting discs being frictionally retained by a centrally disposed, integrally formed hub, said centrally disposed hub having a central opening therethrough.

3. In a counterbalancing weight unit for a barbecue spit; the combination comprising a pair of opposingly and adjustably mounted weight members, said weight members being integrally formed with a pair of contacting discs, said contacting discs being deformed laterally, whereby to provide spring action between said contacting discs being frictionally retained by a centrally disposed, integrally formed hub, said centrally disposed hub having a central opening therethrough.

References Cited by the Examiner

UNITED STATES PATENTS

| | | | |
|---|---|---|---|
| 131,782 | 10/1877 | Randall | 74—573 |
| 2,492,066 | 12/1949 | Schildmeier | 74—573 |
| 3,143,003 | 8/1964 | Schmitt | 74—573 |

FRED C. MATTERN, JR., *Primary Examiner.*

W. S. RATLIFF, *Assistant Examiner.*